United States Patent
Park et al.

(10) Patent No.: US 9,872,283 B2
(45) Date of Patent: Jan. 16, 2018

(54) REPEATER FOR RECEIVING SIGNALS FROM A BASE STATION IN A WIRELESS COMMUNICATION SYSTEM, AND SIGNAL RECEIVING METHOD

(71) Applicant: LG ELECTRONICS INC., Seoul (KR)

(72) Inventors: Kyu Jin Park, Anyang-si (KR); Sung Ho Moon, Anyang-si (KR); Yeong Hyeon Kwon, Anyang-si (KR); Jae Hoon Chung, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 259 days.

(21) Appl. No.: 14/593,794

(22) Filed: Jan. 9, 2015

(65) Prior Publication Data

US 2015/0146609 A1     May 28, 2015

Related U.S. Application Data

(63) Continuation of application No. 13/497,241, filed as application No. PCT/KR2010/006435 on Sep. 17, 2010.

(Continued)

(30) Foreign Application Priority Data

Sep. 17, 2010 (KR) .................. 10-2010-0091693

(51) Int. Cl.
*H04B 7/00* (2006.01)
*H04W 72/04* (2009.01)
(Continued)

(52) U.S. Cl.
CPC .......... *H04W 72/042* (2013.01); *H04B 7/155* (2013.01); *H04B 7/2606* (2013.01); *H04L 5/0053* (2013.01)

(58) Field of Classification Search
CPC . H04W 16/24; H04W 16/26; H04W 72/1273; H04W 72/1289
(Continued)

(56) References Cited

U.S. PATENT DOCUMENTS 8,761,074 B2 * 6/2014 Blankenship ........ H04B 7/2606
    370/315
9,048,924 B2 * 6/2015 Chung .................. H04B 7/155
(Continued)

*Primary Examiner* — Dmitry H Levitan
(74) *Attorney, Agent, or Firm* — Lee, Hong, Degerman, Kang & Waimey

(57) ABSTRACT

Disclosed are a repeater for receiving signals from a base station in a wireless communication system, and a signal receiving method. The base station reports, to each repeater, information on the aggregation level of a relay-control channel element (R-CCE) of a relay-physical downlink control channel (R-PDCCH) via an explicit signaling method or implicit signaling method. In the event the base station reports via an explicit signaling method, the repeater receives, from the base station, information on the aggregation level of R-CCE which is a transmission unit of R-PDCCH, wherein the information contains control information for the repeater. Then, the repeater decodes an R-PDCCH region on an R-CCE aggregation level basis in accordance with the received R-CCE aggregation level information.

11 Claims, 8 Drawing Sheets

Related U.S. Application Data

(60) Provisional application No. 61/244,423, filed on Sep. 21, 2009.

(51) Int. Cl.
*H04B 7/155* (2006.01)
*H04B 7/26* (2006.01)
*H04L 5/00* (2006.01)

(58) Field of Classification Search
USPC .......................... 370/310, 315, 327, 328, 349
See application file for complete search history.

(56) References Cited

U.S. PATENT DOCUMENTS

| | | |
|---|---|---|
| 9,374,150 B2 * | 6/2016 | Raaf ...................... H04B 7/155 |
| 2009/0003274 A1 | 1/2009 | Kwak et al. |
| 2009/0074090 A1 | 3/2009 | Xu et al. |
| 2009/0207797 A1 | 8/2009 | Shen et al. |
| 2009/0257449 A1 | 10/2009 | Chen et al. |
| 2010/0275083 A1 * | 10/2010 | Nam ................. H03M 13/6306 714/748 |
| 2011/0038303 A1 | 2/2011 | Ji et al. |

* cited by examiner (a)

(b)

(a)

(b)

(c)

REPEATER FOR RECEIVING SIGNALS FROM A BASE STATION IN A WIRELESS COMMUNICATION SYSTEM, AND SIGNAL RECEIVING METHOD

CROSS REFERENCE TO RELATED APPLICATIONS

This application is a continuation of U.S. patent application Ser. No. 13/497,241, filed on Mar. 20, 2012, now U.S. Pat. No. 8,965,273, which is the National Stage filing under 35 U.S.C. 371 of International Application No. PCT/KR2010/006435, filed on Sep. 17, 2010, which also claims the benefit of earlier filing date and right of priority to Korean Patent Application No. 10-2010-0091693, filed on Sep. 17, 2010, and also claims the benefit of U.S. Provisional Application No. 61/244,423, filed on Sep. 21, 2009, the contents of which are all hereby incorporated by reference herein in their entirety.

TECHNICAL FIELD

The present invention relates to wireless communication, and more particularly, to a relay node for receiving signals and a signal reception method of the relay node.

BACKGROUND ART

As an example of a mobile communication system to which the present invention is applicable, a 3rd Generation Partnership Project Long Term Evolution (hereinafter, "LTE") and LTE-Advanced (hereinafter, "LTE-A") communication system is described in brief.

FIG. 1 is a diagram schematically showing a network structure of an E-UMTS as an exemplary mobile communication system.

Referring to FIG. 1, an Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist in one eNB. A cell is set to use one of bandwidths of 1.25, 2.5, 5, 10, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface for transmitting user traffic or control traffic may be used between eNBs. A Core Network (CN) may include the AG, a network node for user registration of the UE, and the like. The AG manages mobility of a UE on a Tracking Area (TA) basis, wherein one TA includes a plurality of cells.

Although radio communication technology has been developed up to LTE based on Wideband Code Division Multiple Access (WCDMA), demands and expectations of users and providers continue to increase. In addition, since other radio access technologies continue to be developed, new technical evolution is required to secure future competitiveness. Decrease of cost per bit, increase of service availability, flexible use of a frequency band, simple structure, open interface, and suitable power consumption by a UE are required.

Recently, 3GPP has been establishing a standard task for a subsequent technique of LTE. In this specification, such a technique is referred to as "LTE-A". One of the main differences between an LTE system and an LTE-A system is system bandwidth and the introduction of a Relay Node (RN). The LTE-A system is aimed at supporting a broadband of a maximum of 100 MHz and, to this end, the LTE-A system is designed to use a carrier aggregation or bandwidth aggregation technique using a plurality of frequency blocks. Carrier aggregation employs a plurality of frequency blocks as one large logical frequency band in order to use a wider frequency band. A bandwidth of each frequency block may be defined based on a bandwidth of a system block used in the LTE system. Each frequency block is transmitted using a component carrier.

As described above, in the LTE-A system introducing the RN, research into resource allocation for transmitting control information for the RN and resource allocation for transmitting system information (or broadcast information) for the RN has not been conducted. In addition, a specific method in which an eNB signals control information for the RN and resource allocation information for broadcast information transmission has not been proposed.

Furthermore, although it is necessary to know a start point of an R-PDSCH in order for the RN to perform decoding by successfully receiving signals and control information from the eNB, a specific method therefor has not been proposed.

DETAILED DESCRIPTION OF THE INVENTION

Technical Problems

It is a technical object of the present invention to provide a method for receiving signals at an RN in a wireless communication system.

It is another technical object of the present invention to provide an RN for receiving signals in a wireless communication system.

It will be appreciated by persons skilled in the art that that the technical objects to be achieved by the present invention are not limited to what has been particularly described hereinabove and other technical objects not mentioned above will be more clearly understood from the following detailed description.

Technical Solutions

To achieve the above technical object, a method for receiving signals at a relay node (RN) in a wireless communication system includes receiving information about an aggregation level of a Relay-Control Channel Element (R-CCE) from an eNode B, wherein the R-CCE is a transmission unit of a Relay-Physical Downlink Control Channel (R-PDCCH) including control information for the relay node, and decoding the R-PDCCH in units of the R-CCE aggregation level based on the received information about the R-CCE aggregation level.

The method may further include receiving a signal from the eNode B through a Relay-Physical Downlink Shared Channel (R-PDSCH) corresponding to the R-PDCCH based on control information of the decoded R-PDCCH.

The R-CCE aggregation level may be any one of 1, 2, 4, and 8 and may be applied to each of specific control information. The R-CCE aggregation level may be transmitted through a specific field of an R-Downlink Control Information (R-DCI) format.

To achieve above another technical object, a relay node (RN) for receiving signals in a wireless communication system includes a receiver for receiving information about an aggregation level of a Relay-Control Channel Element (R-CCE) from an eNode B, wherein the R-CCE is a transmission unit of a Relay-Physical Downlink Control Channel (R-PDCCH) including control information for the relay node, and a processor for decoding the R-PDCCH in units of the R-CCE aggregation level based on the received information about the R-CCE aggregation level.

The processor may control the receiver to receive a signal from the eNode B through a Relay-Physical Downlink Shared Channel (R-PDSCH) corresponding to the R-PDCCH based on control information of the decoded R-PDCCH.

The R-CCE aggregation level may be any one of 1, 2, 4, and 8. The R-CCE aggregation level may be applied to each of specific control information. The R-CCE aggregation level may be transmitted through a specific field of an R-Downlink Control Information (R-DCI) format.

Advantageous Effects

Using a signal reception method according to embodiments of the present invention, an RN can improve communication performance by successfully decoding control information through a backhaul link from an eNB.

It will be appreciated by persons skilled in the art that that the effects that can be achieved through the present invention are not limited to what has been particularly described hereinabove and other advantages not mentioned above will be more clearly understood from the following detailed description.

BRIEF DESCRIPTION OF THE DRAWINGS

The accompanying drawings, which are included as a part of the detailed description to provide a further understanding of the invention, provide embodiments of the invention and together with the description serve to explain the principle of the invention. In the drawings.

BEST MODE FOR CARRYING OUT THE INVENTION

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, although the following detailed description is given under the assumption of a 3GPP LTE system as a mobile communication system, it is applicable to other arbitrary mobile communication systems except for matters that are specific to the 3GPP LTE system.

In some instances, known structures and devices are omitted or are shown in block diagram, focusing on important features of the structures and devices, so as not to obscure the concept of the present invention. The same reference numbers will be used throughout this specification to refer to the same parts.

The following description assumes that a User Equipment (UE) refers to a mobile or fixed user equipment such as a Mobile Station (MS) or an Advanced Mobile Station (AMS) and a Base Station (BS) refers to an arbitrary node of a network stage communicating with a UE, such as a Node B, an eNode B (eNB), or Access Point (AP). In addition, a Relay Node (RN) may be referred to as a Relay Station (RS) or a relay.

In a mobile communication system, a UE may receive information through downlink from an eNB, and the UE may transmit information through uplink. Information transmitted and received by the UE includes data and various control information. A variety of physical channels are present according to types or usages of information transmitted or received by the UE.

Figure 1:
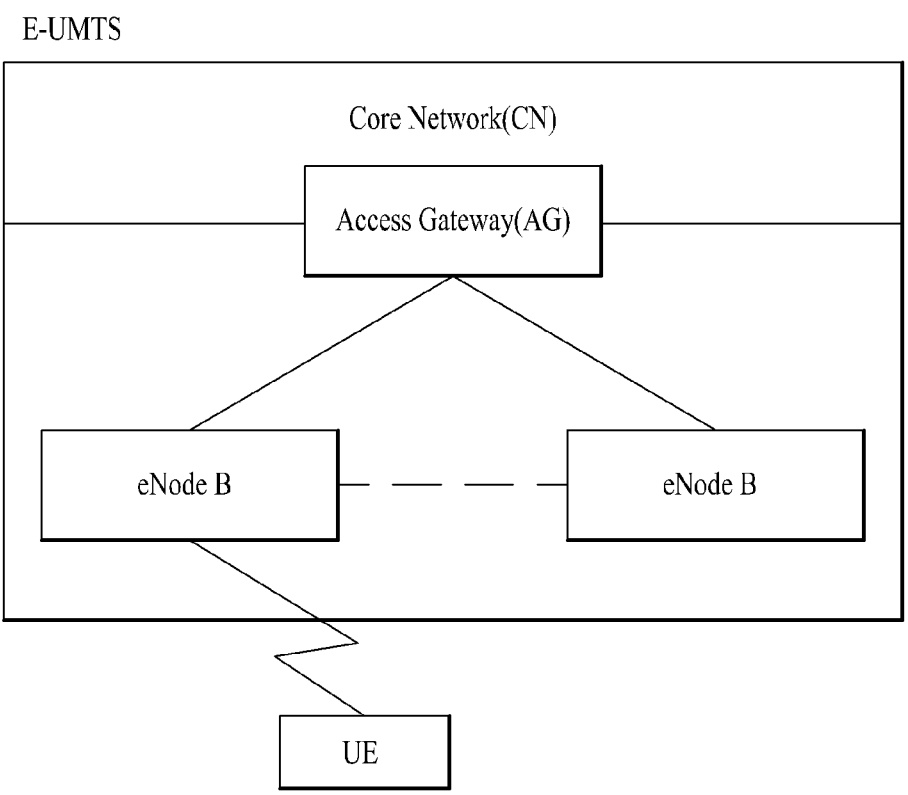
FIG. 1 is a diagram schematically showing a network structure of an E-UMTS as an exemplary mobile communication system.
Figure 2:
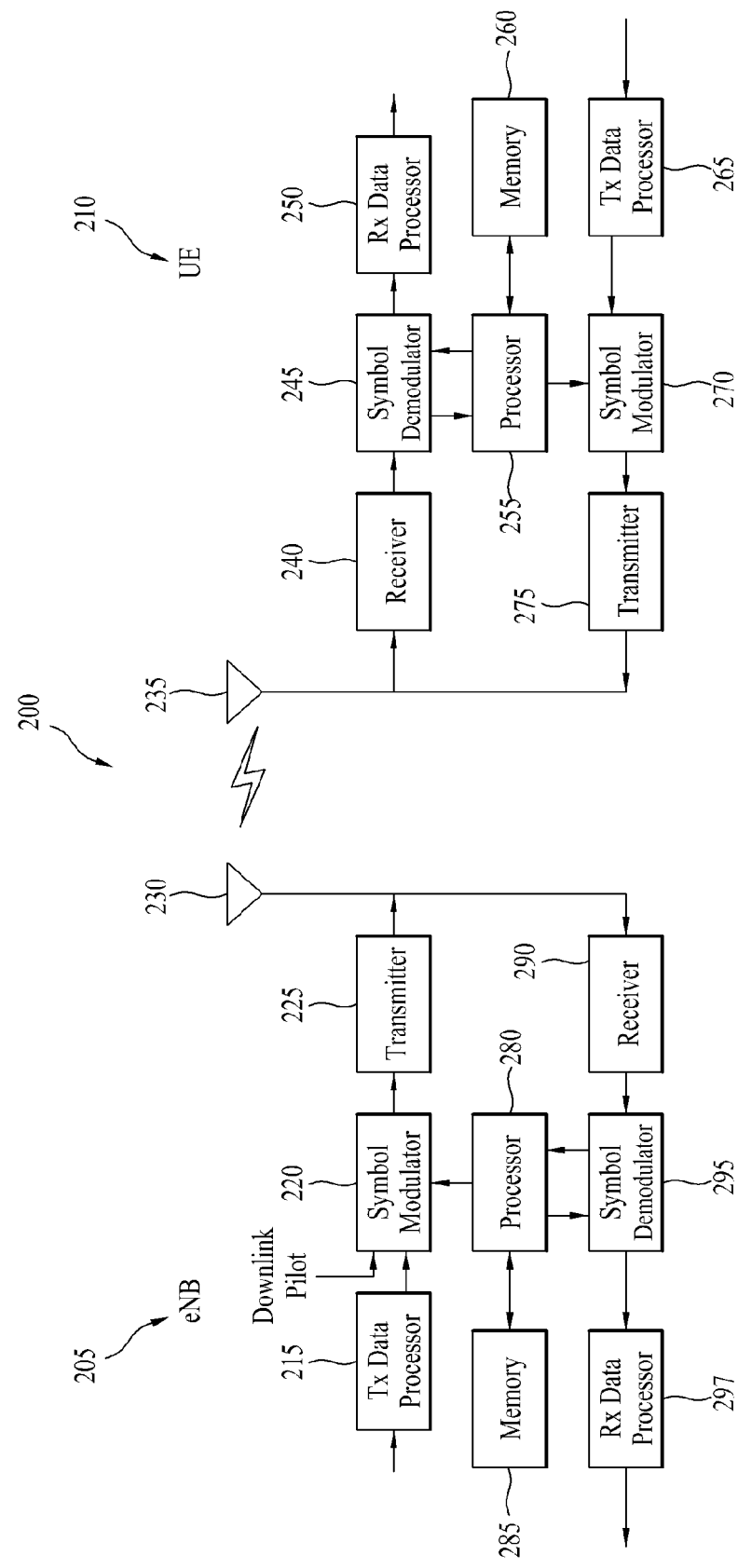
FIG. 2 is a block diagram showing the configuration of an eNB 205 and an RN 210 in a wireless communication system 200 according to the present invention.

FIG. 2 is a block diagram showing the configuration of an eNB 205 and an RN 210 in a wireless communication system 200 according to the present invention.

The wireless communication system 200 depicts one eNB 205 and one RN 210 for sake of brevity. However, the wireless communication system 200 may include more than one eNB and/or more than one RN.

Referring to FIG. 2, the eNB 205 may include a transmission (Tx) data processor 215, a symbol modulator 220, a transmitter 225, a transmission/reception (Tx/Rx) antenna 230, a processor 280, a memory 285, a receiver 290, a symbol demodulator 295, and a reception (Rx) data processor 297. The RN 210 may include a Tx data processor 265, a symbol modulator 270, a transmitter 275, a Tx/Rx antenna 235, a processor 255, a memory 260, a receiver 240, a symbol demodulator 245, and an Rx data processor 250. Although one antenna 230 and one antenna 235 are depicted in the eNB 205 and the RN 210, respectively, each of the eNB 205 and the RN 210 includes a plurality of antennas. Accordingly, the eNB 205 and the RN 210 according to the present invention support a Multiple Input Multiple Output (MIMO) system. The eNB 205 according to the present invention may support both a Single User-MIMO (SU-MIMO) scheme and a Multi User-MIMO (MU-MIMO) scheme.

In downlink, the Tx data processor 215 receives, formats, codes, interleaves, and modulates (or symbol maps) traffic data and provides modulation symbols ("data symbols"). The symbol modulator 220 receives and processes the data symbols and pilot symbols and provides a stream of symbols.

The symbol modulator 220 multiplexes the data and pilot symbols and transmits the multiplexed symbols to the transmitter 225. Each transmission symbol may be a data symbol, a pilot symbol, or a signal value of zero. Pilot symbols may be sent continuously in each symbol period. Pilot symbols may be Frequency Division Multiplexed (FDM), Orthogonal Frequency Division Multiplexed (OFDM), Time Division Multiplexed (TDM), or Code Division Multiplexed (CDM) symbols.

The transmitter 225 receives and converts the stream of symbols into one or more analog signals and further coordinates (e.g., amplifies, filters, and frequency up-converts) the analog signals to generate a downlink signal suitable for transmission over a radio channel. The downlink signal is then transmitted through the antenna 230 to the RN.

The configuration of the RN 210 is described. The antenna 235 of the RN receives the downlink signal from the eNB 205 and provides the received signal to the receiver 240. The receiver 240 coordinates (e.g., filters, amplifies, and frequency down-converts) the received signal and digitizes the coordinated signal to obtain samples. The symbol demodulator 245 demodulates received pilot symbols and provides the demodulated pilot symbols to the processor 255 for channel estimation.

The symbol demodulator 245 receives a frequency response estimate for downlink from the processor 255, performs data demodulation upon received data symbols to obtain data symbol estimates (which are estimates of transmitted data symbols), and provides the data symbol estimates to the Rx data processor 250. The Rx data processor 250 demodulates (e.g., symbol demaps), deinterleaves, and decodes the data symbol estimates to recover the transmitted traffic data.

Processing by the symbol demodulator 245 and the Rx data processor 250 is complementary to processing by the symbol modulator 220 and the Tx data processor 215, respectively, in the eNB 205.

In uplink, the Tx data processor 265 of the relay 210 processes traffic data and provides data symbols. The symbol modulator 270 receives and multiplexes the data symbols, performs modulation, and provides a stream of symbols to the transmitter 275. The transmitter 275 then receives and processes the stream of symbols to generate an uplink signal, which is transmitted through the antenna 235 to the eNB 205.

In the eNB 205, the uplink signal from the RN 210 is received through the antenna 230 and the receiver 290 processes the received uplink signal to obtain samples. The symbol demodulator 295 then processes the samples and provides received pilot symbols and data symbol estimates for uplink. The Rx data processor 297 processes the data symbol estimates to recover traffic data transmitted from the RN 210.

The processors 255 and 280 of the RN 210 and the eNB 205 direct (e.g., control, coordinate, manage, etc.) operation at the RN 210 and the eNB 205, respectively. The respective processors 255 and 280 may be connected to the memories 260 and 285 that store program codes and data. The memories 260 and 285 are connected to the processor 280 to store an operating system, applications, and general files.

The processors 255 and 280 may be referred to as controllers, microcontrollers, microprocessors, microcomputers, etc.

Meanwhile, the processors 255 and 280 may be implemented by hardware, firmware, software, or combinations thereof. When a signal reception method of the RN according to embodiments of the present invention is achieved using hardware, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs), which are configured to perform the present invention, may be included in the processors 255 and 280.

On the other hand, when the signal reception method of the RN according to embodiments of the present invention is achieved using firmware or software, firmware or software may be configured to include a module, a procedure, a function, etc. performing functions or operations of the present invention. The firmware or software configured to perform the present invention may be included in the processors 255 and 280 or stored in the memories 260 and 285 so as to be executed by the processors 255 and 280.

Layers of a radio interface between the RN 210 and eNB 205 and a radio communication system (network) may be divided into a first layer (L1), a second layer (L2) and a third layer (L3), based on the three lower layers of an Open System interconnection (OSI) model widely known in communication systems. A physical layer belonging to the first layer provides information transfer services through a physical channel, A Radio Resource Control (RAC) layer belonging to the third layer provides control radio resources between a UE and the network. The RN 210 and the eNB 205 may exchange RRC messages with the radio communication network through the RRC layer.

Figure 3:
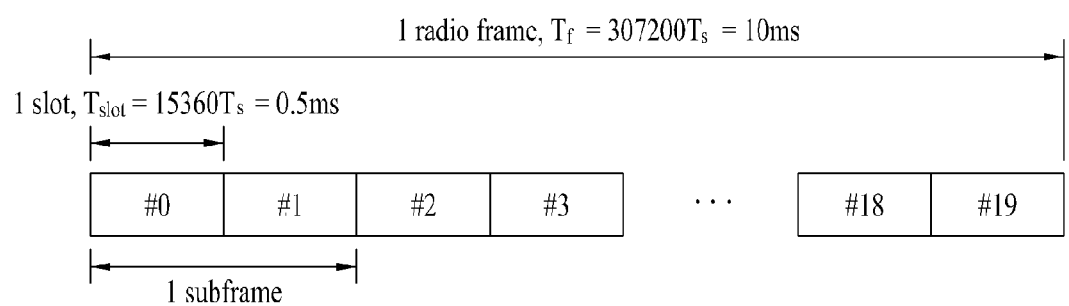
FIG. 3 is a diagram showing the structure of a radio frame used in a 3GPP LTE system which is an exemplary mobile communication system.

FIG. 3 is a diagram showing the structure of a radio frame used in a 3GPP LTE system which is an exemplary mobile communication system.

Referring to FIG. 3, one radio frame has a length of 10 ms (327200 $T_s$) and includes 10 equally-sized subframes. Each of the subframes has a length of 1 ms and includes two slots. Each of the slots has a length of 0.5 ms (15360 $T_s$). In this case, $T_s$ denotes sampling time and is represented by $T_s=1/(15\ kHz \times 2048)=3.2552 \times 10-8$ (about 33 ns). Each slot includes a plurality of OFDM symbols or SC-FDMA symbols in a time domain and includes a plurality of resource blocks in a frequency domain.

In the LTE system, one resource block includes 12 sub-carriers×7 (or 6) OFDM symbols or Single Carrier-Frequency Division Multiple Access (SC-FDMA) symbols. A Transmission Time Interval (TTI) which is a unit time for data transmission may be determined in units of one or more subframes. The above-described structure of the radio frame is purely exemplary and various modifications may be made in the number of subframes included in the radio frame, the number of slots included in a subframe, the number of OFDM or SC-FDMA symbols included in a slot.

Figure 4:
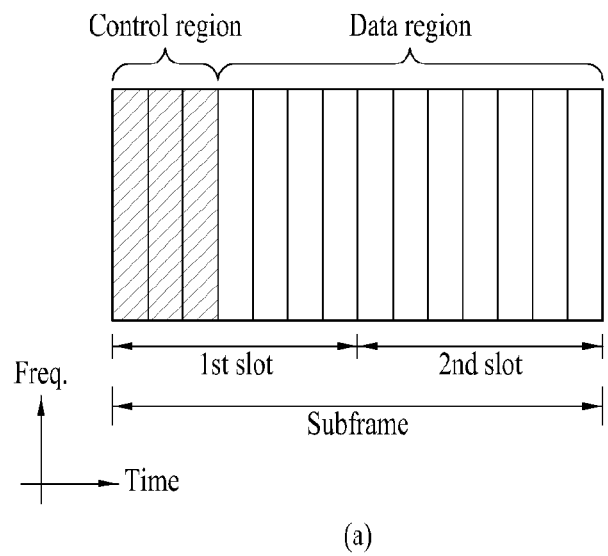
FIG. 4 is a diagram showing the structure of downlink and uplink subframes of a 3GPP LTE system which is an exemplary mobile communication system.
Figure 4:
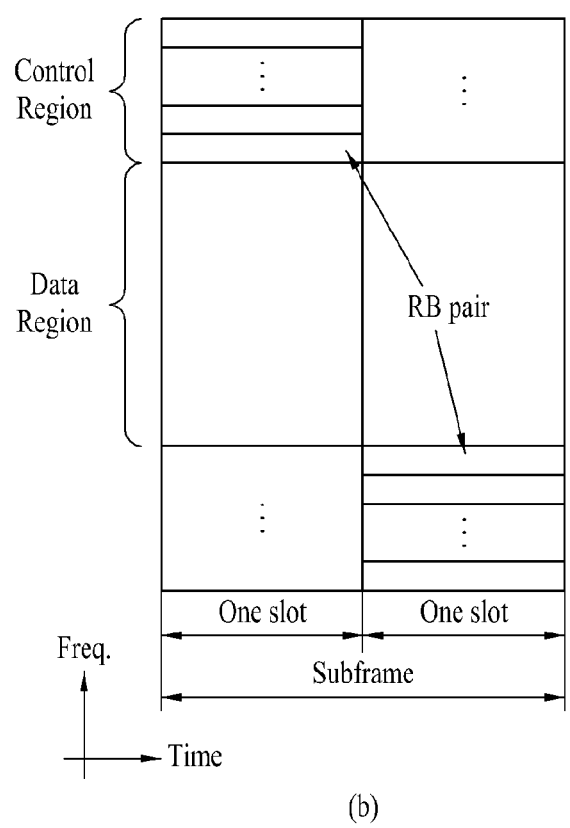

FIG. 4 is a diagram showing the structure of downlink and uplink subframes of a 3GPP LTE system which is an exemplary mobile communication system.

Referring to FIG. 4(a), one downlink subframe includes two slots in a time domain. A maximum of 3 front OFDM symbols of the first slot within the downlink subframe is a control region in which control channels are allocated, and the other OFDM symbols are a data region in which a Physical Downlink Shared Channel (PDSCH) is allocated.

Downlink control channels used in the 3GPP LTE system include a Physical Control Format Indicator Channel (PCFICH), a Physical Downlink Control Channel (PDCCH), a Physical Hybrid-ARQ Indicator Channel (PHICH), etc. The PCFICH, which is transmitted in the first OFDM symbol of a subframe, carries information about the number of OFDM symbols, (i.e. the size of a control region), used for transmission of control channels within the subframe. Control information transmitted through the PDCCH is referred to as Downlink Control Information (DCI). The DCI indicates uplink resource allocation information, downlink resource allocation information, and an uplink transmit power control command for certain UE groups. The PHICH carries Acknowledgement (ACK)/Negative-Acknowledgement (NACK) signals for uplink Hybrid Automatic Repeat Request (HARQ). Namely, the ACK/NACK signals for uplink data transmitted by a UE are transmitted through the PHICH.

Now, a PDCCH, which is a downlink physical channel, is described.

An eNB may transmit, through the PDCCH, a PDSCH resource allocation and transport format (this is called DL grant), an aggregate of transmit power control commands for individual UEs within a certain UE group, and activation of a Voice over Internet Protocol (VoIP). A plurality of PDCCHs may be transmitted within a control region and a UE may monitor the plurality of PDCCHs. The PDCCH consists of one or consecutive Control Channel Element (CCE) aggregations. The PDCCH consisting of one or a few consecutive CCE aggregations may be transmitted through the control region after sub-block interleaving. A CCE is a logical allocation unit used to provide a code rate according to the state of a radio channel to the PDCCH. The CCE corresponds to a plurality of Resource Element Groups (REGs). A format of the PDCCH and a possible number of PDCCHs are determined according to a correlation between the number of CCEs and a code rate provided by the CCEs.

Control information transmitted through the PDCCH is referred to as Downlink Control Information (DCI). The following Table 1 shows DCI according to a DCI format.

TABLE 1

| DCI format | Description |
|---|---|
| DCI format 0 | Used for the scheduling of PUSCH |
| DCI format 1 | Used for the scheduling of one PDSCH codeword |
| DCI format 1A | Used for the compact scheduling of one PDSCH codeword and random access procedure initiated by a PDCCH order |
| DCI format 1B | Used for the compact scheduling of one PDSCH codeword with precoding information |
| DCI format 1C | Used for very compact scheduling of one PDSCH codeword |
| DCI format 1D | Used for the compact scheduling of one PDSCH codeword with precoding and power offset information |
| DCI format 2 | Used for scheduling PDSCH to UEs configured in closed-loop spatial multiplexing mode |
| DCI format 2A | Used for scheduling PDSCH to UEs configured in open-loop spatial multiplexing mode |

TABLE 1-continued

| DCI format | Description |
|---|---|
| DCI format 3 | Used for the transmission of TPC commands for PUCCH and PUSCH with 2-bit power adjustments |
| DCI format 3A | Used for the transmission of TPC commands for PUCCH and PUSCH with single bit power adjustments |

DCI format 0 indicates uplink resource allocation information. DCI formats 1 and 2 indicate downlink resource allocation information. DCI formats 3 and 3A indicate uplink Transmit Power Control (TPC) commands for certain UE groups.

A method for an eNB to map resources for PDCCH transmission in a 3GPP LTE system is described in brief.

Generally, the eNB may transmit scheduling allocation information and other control information through a PDCCH. A physical control channel may be transmitted to one aggregate or a plurality of consecutive CCEs. That is, a unit for transmitting the PDCCH in the eNB is a CCE. One CCE includes 9 REGs. The number of REGs which are not allocated to a PCFICH or PHICH is $N_{REG}$. CCEs which are available in a system are from 0 to $N_{CCE}-1$ (where $N_{CCE}=\lfloor N_{REG}/9 \rfloor$). The PDCCH supports multiple formats as shown in the following Table 2. One PDCCH consisting of n consecutive CCEs starts from a CCE performing i mode n=0 (where i is a CCE number). Multiple PDCCHs may be transmitted to one subframe.

TABLE 2

| PDCCH format | Number of CCEs | Number of resource element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, the eNB may determine a PDCCH format depending on to how many regions control information is to be transmitted. A UE may reduce overhead by reading control information in units of CCEs. Similarly, an RN may read control information in units of Relay-CCEs (R-CCEs). In an LTE-A system, the eNB may map Resource Elements (REs) in units of R-CCEs to transmit a PDCCH for a certain RN, i.e. an R-PDCCH.

Referring to FIG. 4(b), an uplink subframe may be divided into a control region and a data region in a frequency domain. A Physical Uplink Control Channel (PUCCH) is allocated to the control region to deliver uplink control information. A Physical Uplink Shared Channel (PUSCH) is allocated to the data region to deliver user data. To maintain a single carrier characteristic, one UE does not transmit the PUCCH and the PUSCH simultaneously. A PUCCH for one UE may be allocated as a Resource Block (RB) pair in one subframe. RBs belonging to the RB pair occupy different subcarriers in two slots. The RB pair allocated to the PUCCH is frequency-hopped at a slot boundary.

Figure 5:
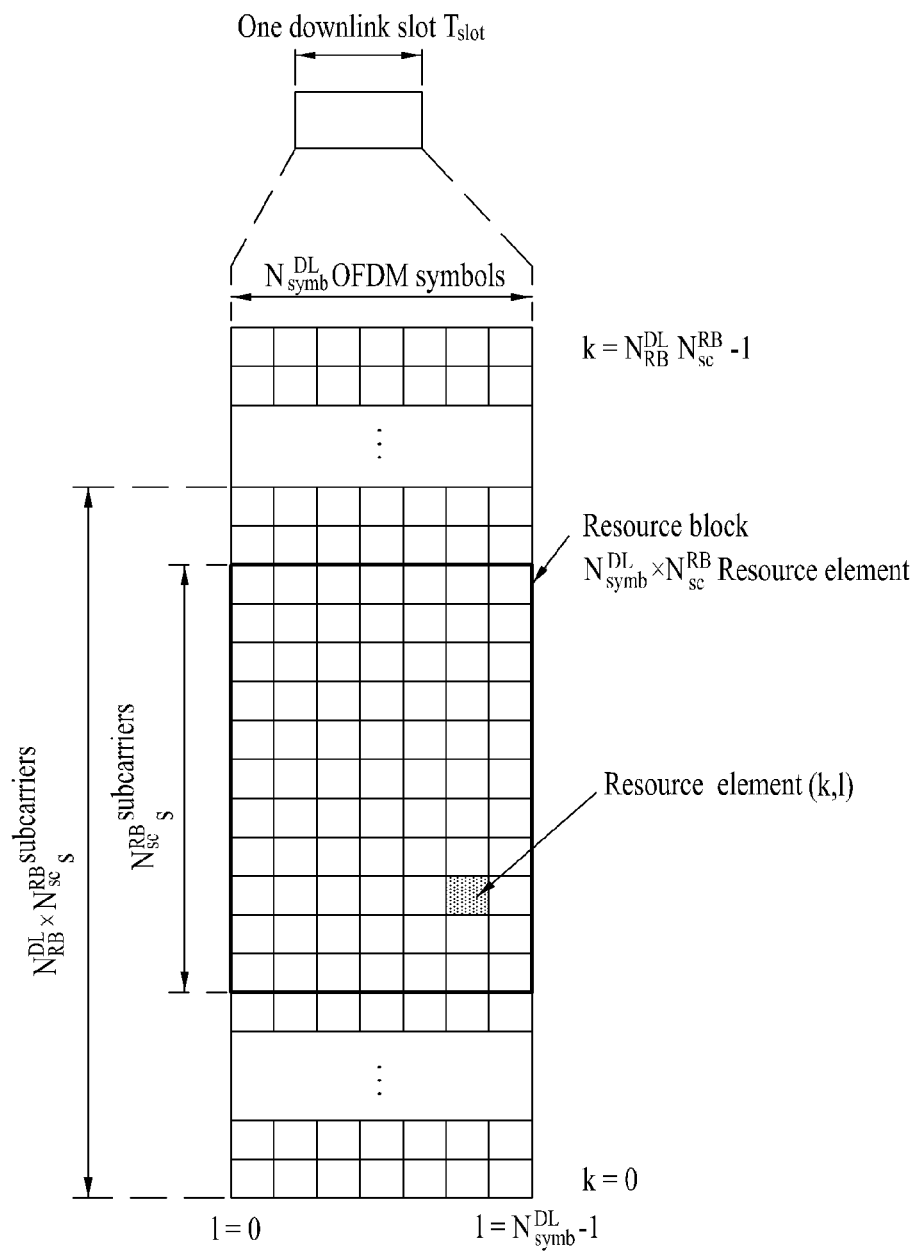
FIG. 5 is a diagram showing a downlink time-frequency resource grid structure used in the present invention.

FIG. 5 is a diagram showing a downlink time-frequency resource grid structure used in the present invention.

A downlink signal transmitted in each slot uses a resource grid structure including $N_{RB}^{DL} \times N_{SC}^{RB}$ subcarriers and $N_{symb}^{DL}$ OFDM symbols, wherein $N_{RB}^{DL}$ represents the number of RBs in downlink, $N_{SC}^{RB}$ represents the number of subcarriers constituting one RB, and $N_{symb}^{DL}$ represents the number of OFDM symbols in one downlink slot. The size of $N_{RB}^{DL}$ varies according to a downlink transmission bandwidth configured within a cell and should satisfy $N_{RB}^{min,DL} \leq N_{RB}^{DL} \leq N_{RB}^{max,DL}$, wherein $NR_{RB}^{min,DL}$ denotes the smallest downlink bandwidth supported by a wireless communication system and $N_{RB}^{max,RB}$ denotes the greatest downlink bandwidth supported by a wireless communication system. $N_{RB}^{min,DL}$ may be 6 and $N_{RB}^{max,RB}$ may be 110. However, the present invention is not limited thereto. The number of OFDM symbols included in one slot may vary according to the length of a Cyclic Prefix (CP) and the spacing of subcarriers. In the case of MIMO transmission, one resource grid per antenna port may be defined.

Each element in the resource grid for each antenna port is called an RE and is uniquely identified by an index pair (k, l) in a slot, wherein k is a frequency-domain index having any one value of 0 to $N_{RB}^{DL}N_{SC}^{RB}-1$ and l is a time-domain index having any one value of 0 to $N_{symb}^{DL}-1$.

The RB shown in FIG. 5 is used to describe a mapping relationship between any physical channel and REs. The RB may be divided into a Physical Resource Block (PRB) and a Virtual Resource Block (VRB). One PRB is defined as $N_{symb}^{DL}$ consecutive OFDM symbols in a time domain and $N_{SC}^{RB}$ consecutive subcarriers in a frequency domain, wherein $N_{DL}^{symb}$ and $N_{SC}^{RB}$ may be predetermined. For example, $N_{DL}^{symb}$ and $N_{SC}^{RB}$ may be given as shown in the following Table 3. Accordingly, one PRB includes $N_{symb}^{DL} \times N_{SC}^{RB}$ REs. Although one PRB may correspond to one slot in a time domain and to 180 kHz in a frequency domain, the present invention is not limited thereto.

TABLE 3

| Configuration | | $N_{SC}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

The PRB has a value ranging from 0 to $N_{RB}^{DL}-1$. A relationship between a PRB number $n_{PRB}$ in a frequency domain and a RE (k,l) in one slot satisfies $$n_{PRB} = \left\lfloor \frac{k}{N_{SC}^{RB}} \right\rfloor.$$

The size of the VRB is the same as the size of the PRB. The VRB may be divided into Localized VRB (LVRB) and a Distributed VRB (DVRB). With respect to each type of VRB, one pair of VRBs in two slots within one subframe is allocated together with a single VRB number $n_{VRB}$.

The size of the VRB may be the same as the size of the PRB. Two types of VRBs are defined as Localized VRB (LVRB) and a Distributed VRB (DVRB). With respect to each type of VRB, a pair of VRBs is allocated over two slots of one subframe with a single VRB index (hereinafter, may be referred to as a VRB number). In other words, any one index ranging from 0 to $N_{RB}^{DL}-1$ is allocated to $N_{RB}^{DL}$ VRBs belonging to a first slot of two slots constituting one subframe and similarly any one index ranging from 0 to $N_{RB}^{DL}-1$ is allocated to $N_{RB}^{DL}$ VRBs belonging to a second slot of two slots constituting one subframe.

The above-described radio frame structure, downlink and uplink subframes, and downlink time-frequency resource grid structure shown in FIG. 3 to FIG. 5 may be applied to an eNB-RN structure.

An R-PDCCH used in the present invention refers to a backhaul physical downlink control channel for relay transmission from the eNB to the RN. An R-PUCCH is used to refer to a backhaul physical uplink control channel for relay transmission from the RN to the eNB. An R-PDSCH is used to refer to a backhaul downlink physical data shared channel for relay transmission. An R-PUSCH is used to refer to a backhaul uplink physical data shared channel for relay transmission.

Although the RN used in the present invention is described as a half-duplex RN in which simultaneous bidirectional transmission and reception through the same band is not possible, the RN is not necessarily limited to a half-duplex scheme.

Figure 6:
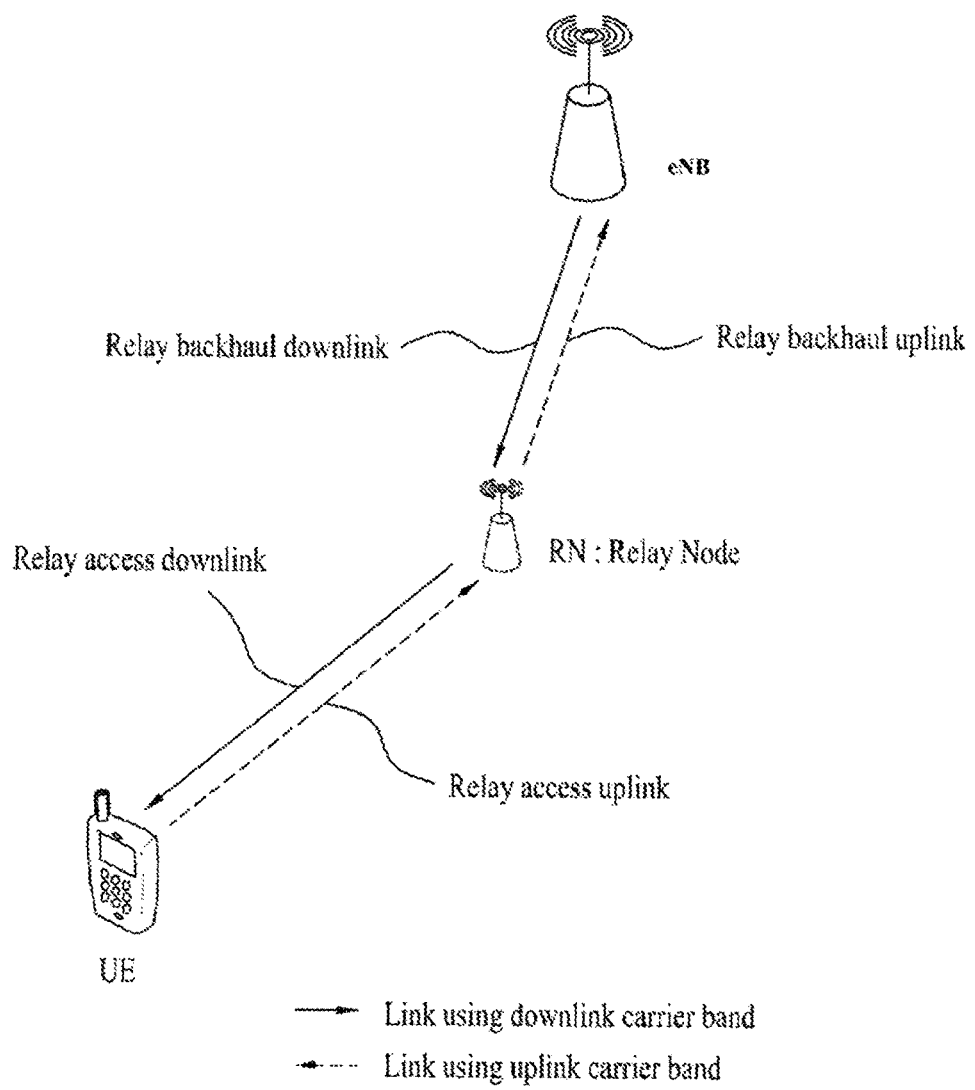
FIG. 6 is a diagram showing the configuration of relay backhaul links and relay access links in a wireless communication system.

FIG. 6 is a diagram showing the configuration of relay backhaul links and relay access links in a wireless communication system.

Referring to FIG. 6, while an LTE-A system introduces a role of forwarding a link between an eNB and a UE to an RN, two types of links having different attributes are applied to uplink and downlink carrier frequency bands. A link part connected between the eNB and the RN is defined as a backhaul link. Transmission through a Frequency Division Duplexing (FDD) or time Division Duplexing (TDD) scheme using downlink resources may be expressed as a backhaul downlink, and transmission through an FDD or TDD scheme using uplink resources may be expressed as a backhaul uplink.

The RN may receive information from the eNB through a relay backhaul downlink and may transmit information to the eNB through a relay backhaul uplink. The RN may transmit information to a UE through a relay access downlink and may receive information from the UE through a relay access uplink.

The eNB is necessary to additionally configure a new physical control channel for the RN while maintaining compatibility with LTE release-8. Here, the new physical control channel for the RN is referred to as an R-PDCCH and a data channel for the RN is referred to as an R-PDSCH. An RN zone may include the R-PDCCH and the R-PDSCH.

When the eNB allocates resources for the R-PDCCH in the LTE-A system, reliability, scheduling flexibility, and decoding latency are considered. In terms of reliability, it is possible to obtain a scheduling gain or diversity gain for the R-PDCCH. In addition, it is also possible to cause the RN to blindly decode an allocated R-PDCCH or to allocate a specific R-PDCCH to each RN. In terms of scheduling flexibility, the eNB may dynamically allocate resources in an RN zone. In terms of decoding latency, the eNB desirably reduces decoding latency by allocating resources using a TDM scheme rather than an FDM scheme between the R-PDCCH and the R-PDSCH. Although the present invention applies the TDM scheme as a multiplexing scheme between the R-PDCCH and the R-PDSCH, it is apparent that the same method may be applied even when the FDM scheme is applied.

In an LTE system, the RN cannot receive a PDCCH from the eNB. Although it is possible to receive the PDCCH when a subframe of the RN is set to be advanced by 2 or 3 OFDM symbols compared to a subframe of the eNB, it is difficult to perform cooperative transmission between the eNB and the RN. Due to backhaul link quality and a semi-static characteristic of traffic load, dynamic resource allocation as in communication between the eNB and the UE may be unnecessary. Namely, the RN may be configured to transmit signals through a fixed Modulation and Coding Scheme (MCS) using a fixed band according to a subframe pattern for prescribed backhaul communication. Moreover, the eNB may perform distributed resource allocation or localized resource allocation for the RN. The RN may be informed of the subframe pattern for backhaul communication between the eNB and the RN, through higher layer signaling.

Figure 7:
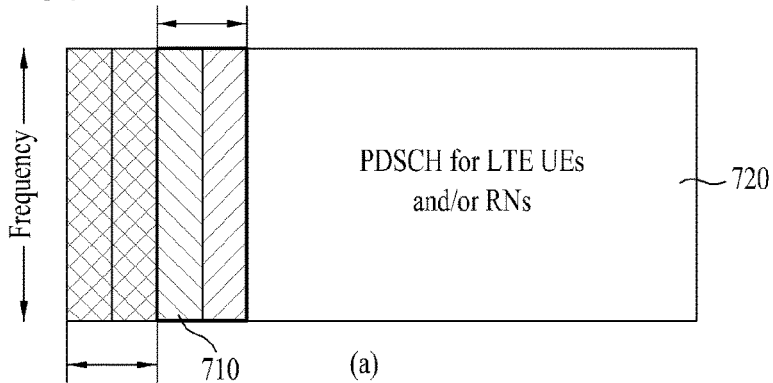
FIG. 7 is a diagram showing an example of a resource area allocated by an eNB to an RN in a 3GPP LTE-A system which is an exemplary mobile communication system.
Figure 7:
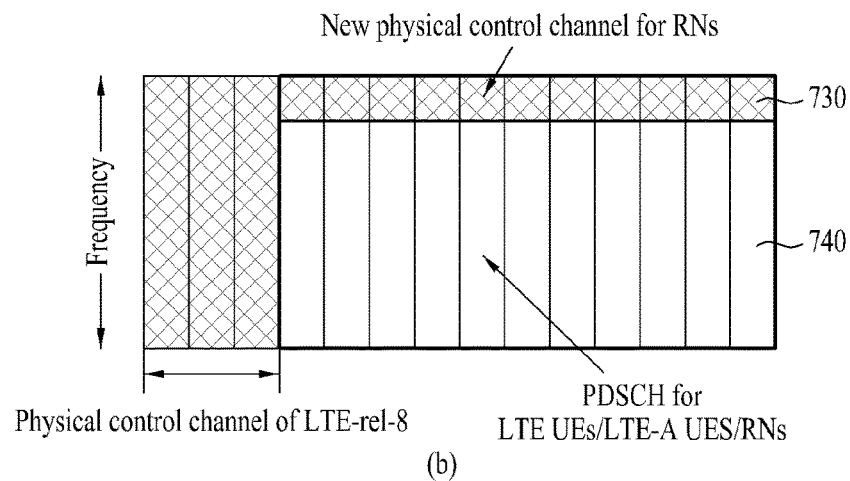
Figure 7:
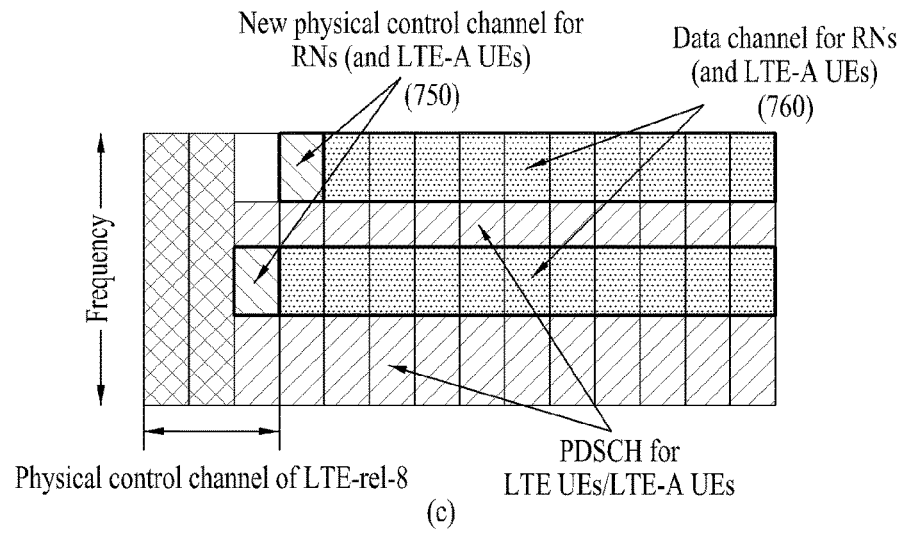

FIG. 7 is a diagram showing an example of a resource area allocated by an eNB to an RN in a 3GPP LTE-A system which is an exemplary mobile communication system.

FIG. 7(a) illustrates a method in which an eNB multiplexes a new physical control channel 710 for an RN, (i.e. an R-PDCCH), and a data channel 720 for an RN, (i.e. an R-PDSCH or PDSCH for RNs) through a Time Division Multiplexing (TDM) scheme. Upon multiplexing the R-PDCCH and R-PDSCH, the eNB may configure a subframe allocated for corresponding backhaul transmission as a Multicast Broadcast Single Frequency Network (MBSFN) in order to maintain compatibility with LTE release-8 and may allocate the new physical control channel 710 and data channel 720 for the RN through the TDM scheme to an MBSFN data region (a part except for a control channel of the MBSFN subframe).

In a subframe allocated for backhaul transmission illustrated in FIG. 7(b), a specific band is allocated as a physical control channel 730 for the RN. Namely, the physical control channel 730 for the RN and a data channel 740 may be multiplexed within a PDSCH region of the corresponding subframe through an FDM scheme and then allocated. Even in this case, the eNB allocates resources to each RN in consideration of traffic load as if the eNB allocates resources to a UE, and the eNB informs the RN of information about resource allocation through the physical control channel 730. The eNB may allocate an additional physical control channel 730 for the RN while maintaining compatibility with LTE release-8.

In a subframe allocated for backhaul transmission illustrated in FIG. 7(c), the eNB allocates a specific band as a physical control channel 750 for the RN. The eNB may multiplex the physical control channel 730 for the RN and a data channel 760 within a corresponding band through TDM. Even in this case, the eNB allocates resources to each RN in consideration of traffic load as if the eNB allocates resources to a UE, and the eNB informs the RN of information about resource allocation through the physical control channel 750. The eNB may allocate an additional physical control channel 750 for the RN while maintaining compatibility with LTE release-8.

As described earlier, a newly allocated physical control channel for the RN by the eNB is referred to as an R-PDCCH. Each RN may perform blind search for resources allocated dynamically for downlink backhaul transmission through an RN identifier (ID). Namely, each RN may detect an R-PDCCH directing the RN by performing, through the RN ID, blind decoding of a time/frequency domain in which the dynamically allocated R-PDCCH is transmitted and may obtain DL grant, UL grant, and control information (e.g. ACK/NACK feedback information) through the detected R-PDCCH. The eNB may inform the RN of information about an RB to be searched by the RN through higher layer signaling. The RN may perform blind search (or decoding) based on the received information about the RB to be searched. In this case, higher layer signaling may be transmitted from the eNB to the RN as a semi-static signal.

An R-PDSCH, which is a downlink backhaul data channel transmitted by the eNB to each RN, may be multiplexed for allocation with the R-PDCCH through TDM in the backhaul subframe as illustrated in FIG. 7(a), through FDM in the backhaul subframe as illustrated in FIG. 7(b), or through TDM or a hybrid of TDM and FDM as in FIG. 7(c).

Figure 8:
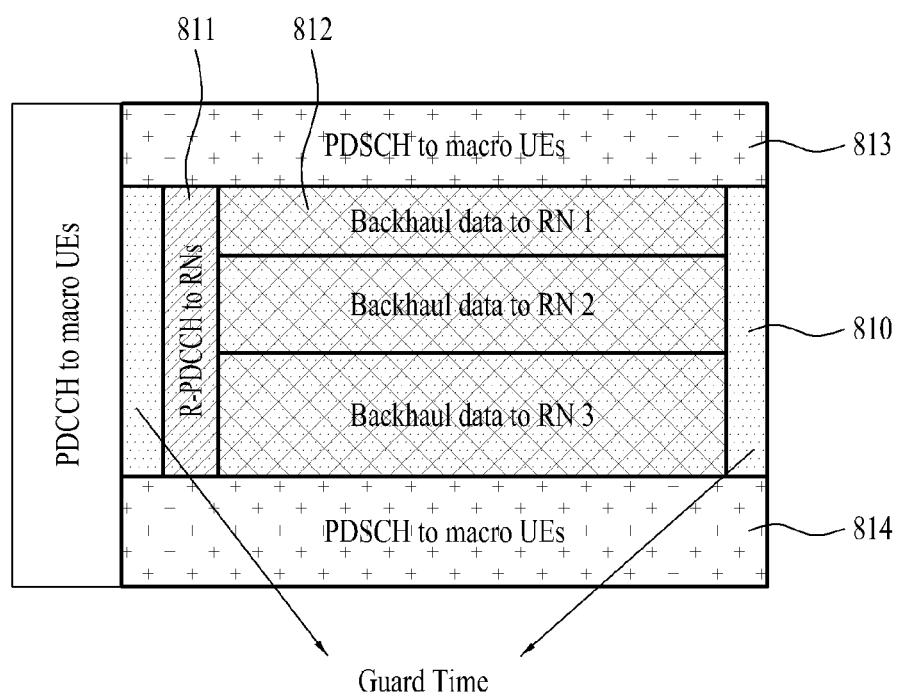
FIG. 8 is a diagram showing an exemplary method for an eNB to allocate an RN zone in a specific backhaul subframe.

FIG. 8 is a diagram showing an exemplary method for an eNB to allocate an RN zone in a specific backhaul subframe.

Referring to FIG. 8, an RN zone 810 includes an R-PDCCH 811 and an R-PDSCH 812 in a specific backhaul subframe shown in FIG. 8 and may be preconfigured for both channels. The R-PDCCH 811 and the R-PDSCH 812 may be multiplexed in a time domain within one RN zone 810. The eNB 205 may obtain a diversity gain using a method of mapping an LTE CCE to REs over the R-PDCCH 811. The processor 255 of the RN 210 (e.g. the RN 1, RN 2, or RN 3 shown in FIG. 7) may detect a region of the R-PDCCH 811 by performing blind search within the previously configured RN zone 810.

As illustrated in FIG. 8, the R-PDSCH 812 transmitted to RNs is scheduled within the zone 810. The size of the RN zone 810 is not dynamically adjusted according to the amount of traffic for RNs. PDSCHs 813 and 814 transmitted to LTE macro UEs are not scheduled in the RN zone 810.

The eNB may RN-specifically determine a search space to be performed blind search by each RN. The eNB may transmit the determined RN-specific search space to each RN through higher layer signaling. Alternatively, the search space in which each RN performs blind search may be cell-specifically determined, and the eNB may broadcast information about the search space (e.g. information about an RB to be searched) to all RNs through cell-specific system information or may transmit the information about the search space to each RN through higher layer signaling. The RN-specific search space or cell-specific search space signaled to each RN may include a subset of RBs. In this case, the eNB may explicitly signal indexes of OFDM symbols in which the R-PDCCH is transmitted to each RN. Alternatively, indexes of OFDM symbols or slots in which the R-PDCCH is transmitted may be implicitly fixed so that the RN may be aware of the indexes.

In an LTE-A system, REs may be mapped in units of Relay-Control Channel Elements (R-CCEs) to transmit the R-PDCCH for an arbitrary RN. Hereinafter, a method for mapping resources to REs when the eNB dynamically allocates resources for R-PDCCH transmission will be described.

<Resource Mapping Method 1 when Resources are Dynamically Allocated>

As a first method, a method may be considered for fixing OFDM symbols for an R-PDCCH at OFDM symbols of indexes 3 to 6 in a time domain of a specific backhaul subframe and varying the number of RBs in a frequency domain.

When a logical basic unit of R-PDCCH transmission for an arbitrary RN by an eNB is defined as an R-CCE, a modulation scheme for R-CCE transmission is determined according to link quality between the eNB and the RN. If the modulation scheme is determined, the number of necessary REs for one R-CCE transmission and indexes of OFDM symbols in which R-PDCCH transmission is performed are determined. One or more OFDM symbols in which R-PDCCH transmission is performed may be implicitly fixed or explicitly signaled to the RN by the eNB. In this case, upon explicitly signaling the OFDM symbols to the RN, the eNB may transmit the OFDM symbols through higher layer signaling to each RN as an RN-specific value, may broadcast the OFDM symbols to all RNs in the form of cell-specific system information as a cell-specific value, or may transmit the OFDM symbols to each RN through higher layer signaling.

Mapping of one R-CCE to REs is basically performed in units of RBs or RB pairs. Namely, although the eNB may explicitly signal the size of one R-CCE (i.e. the number of RBs or RB pairs) to each RN, the size of one R-CCE may be implicitly determined according to the modulation scheme and used OFDM symbols so that the RN is aware of the size of one R-CCE. The RN may perform blind decoding based on an R-CCE size and an R-CCE aggregation level. Namely, if the size of one R-CCE is 4 RB pairs, blind search may be performed in units of 4 consecutive RB pairs.

Multiple search spaces may be configured per R-CCE aggregation. If the number of RB pairs necessary to transmit one R-CCE is determined, a search space is configured according to the R-CCE aggregation level. The RN performs blind search for each search space using RB granularity according to the R-CCE aggregation level.

A variable R-CCE size structure rather than an R-CCE aggregation structure based on a fixed R-CCE size may be applied to each RN according to link quality for each RN. The R-CCE size may be different according to an RN-specific search space for an arbitrary RN or a cell-specific search space. For example, in the case of an RN-specific search space 1 for an RN 1, the R-CCE size may be 2 RB pairs and in the case of an RN-specific search space 2, the R-CCE size may be 3 RB pairs. Each RN may perform blind search based on a corresponding R-CCE size. The eNB may use a fixed modulation order for R-CCE transmission at one value.

An embodiment of the above-described method for fixing an R-PDCCH at one or more OFDM symbols (e.g. OFDM symbols of indexes 3 to 6) in a time domain and varying the number of RBs in a frequency domain will now be described.

First, it is assumed that 16 Quadrature Amplitude Modulation (QAM) is applied to the RN 1 as a modulation scheme for R-PDCCH transmission and Quadrature Phase Shift Keying (QPSK) is applied to the RN 2 as a modulation scheme for R-PDCCH transmission. However, the R-PDCCH modulation scheme applied to each RN is only exemplary and the modulation scheme may be fixed so that the same modulation scheme is implicitly applied to all RNs. It is also assumed that a backhaul subframe uses a normal CP and the R-PDCCH is transmitted to both the RN 1 and the RN 2 through OFDM symbols of indexes 3, 4, 5, and 6. It is also assumed that a Channel State Indicator-Reference Signal (CSI-RS) is not transmitted in the OFDM symbols of indexes 3, 4, 5, and 6.

Under the above assumption, the number of REs which can be used for R-PDCCH transmission through one RB pair is 44, and the RN 1 and RN 2 can transmit 176 bits and 88 bits, respectively.

In the case of the RN 1, if the R-PDCCH is set to have the R-CCE size of 2 RB pairs, a search space 1 (e.g. RB pair indexes 0 to 15) is configured to perform blind search based on an R-CCE aggregation level 1, a search space 2 (e.g. RB pair indexes 16 to 31) is configured to perform blind search based on an R-CCE aggregation level 2, and a search space 3 (e.g. RB pair indexes 32 to 63) is configured to perform blind search based on an R-CCE aggregation level 4, then the RN 1 performs blind decoding a total of 16 times, that is, 16/2=8 times in the search space 1, 16/4=4 times in the search space 2, and 32/8=4 times in the search space 3.

In the case of the RN 2, if the R-PDCCH is set to have the R-CCE size of 4 RB pairs, a search space 1 (e.g. RB pair indexes 16 to 31) is configured to perform blind search based on an R-CCE aggregation level 1, a search space 2 (e.g. RB pair indexes 32 to 63) is configured to perform blind search based on an R-CCE aggregation level 2, and a search space 3 (e.g. RB pair indexes 64 to 95) is configured to perform blind search based on an R-CCE aggregation level 4, then the RN 2 performs blind decoding of 16/4=4 times in the search space 1, 32/8=4 times in the search space 2, and 32/16=2 times in the search space 3.

<Method for Supporting Blind Search in an RN According to Resource Mapping for R-PDCCH Transmission>

1. Explicit Signaling Method

In mapping resources according to the above-described method 1 for dynamically allocating resources, a method for an eNB to support blind search for an R-PDCCH in an RN is described. Namely, a method for an eNB to support blind search (or decoding) of an RN is described when considering the method for fixing OFDM symbols for the R-PDCCH at OFDM symbol indexes 3 to 6 (e.g. OFDM symbols of indexes 3 to 6 of the first slot of a backhaul subframe) in a time domain and varying the number of RBs in a frequency domain.

As a method for an eNB to support blind search in an RN according to the resource mapping method for R-PDCCH transmission, 'R-CCE aggregation level' signaling is discussed. A method for signaling the R-CCE aggregation level broadly includes a method for the eNB to explicitly signal the R-CCE aggregation level to the RN and a method for causing the RN to implicitly be aware of the R-CCE aggregation level without explicit signaling.

Conventionally, in downlink, the eNB has signaled the size of a PDCCH to a UE etc. through a PCFICH so that the UE etc. can be aware of a start point of a time domain (or symbol region) of a PDSCH. However, a start point of an R-PDSCH may vary according to whether an R-PDCCH has been transmitted per PRB and according to the aggregation level of an R-PDCCH, as opposed to the case of the PDSCH. Accordingly, the eNB may explicitly signal information indicating an R-CCE aggregation level to the RN for the purpose of successful decoding of control information of the RN.

When the eNB transmits the R-PDCCH for a specific RN (e.g. RN 1) through arbitrary PRBs (or RB pairs), it may be assumed that the remaining REs except for REs used for R-PDCCH transmission within the corresponding PRBs are used for R-PDSCH transmission for the same RN (e.g. RN 1). Namely, it may be assumed that the eNB does not simultaneously transmit the R-PDCCH and the R-PDSCH for different RNs within the same PRB. Under such assumption, an example of an R-DCI format of the R-PDCCH transmitted by the eNB to the RN is shown in the following Table 4.

TABLE 4

| R-DCI format | Description |
| --- | --- |
| R-DCI format 0 | R-PUSCH allocation |
| R-DCI format 1 and 2 series | R-PDSCH allocation |
| R-DCI format 3 series | Transmit Power Control (TPC) |

In addition to the R-DCI format proposed in Table 4, an information area indicating an R-CCE aggregation level for corresponding R-PDCCH transmission in all R-DCI formats which can be newly defined backhaul-link specifically may be defined. For example, when an R-CCE aggregation level for one R-PDCCH transmission supports 4 aggregation levels of 1, 2, 4, and 8, R-CCE aggregation level indication fields indicating R-CCE aggregation levels for the respective R-DCI formats (e.g. R-DCI format 0, 1, 2, and 3 series) may be defined. The number of bits constituting the R-CCE aggregation level indication field may be differently defined according to the number of R-CCE aggregation levels supported for R-PDCCH transmission. For example, if the number of supported R-CCE aggregation levels is N, the number of bits constituting the R-CCE aggregation level indication field may be defined as floor ($\log_2$ N). Here, a floor function refers to a function which outputs a minimum value among integers greater than or equal to a designated number.

Unlike the above description, the eNB may multiplex, for transmission, an R-PDCCH for a specific RN and an R-PDSCH for another RN through a TDM scheme within the same PRB. In this case, in a structure of an R-DCI format 1 series defined for R-PDSCH allocation, an information area indicating whether the R-PDCCH has been transmitted within a corresponding RB and indicating an R-CCE aggregation level of the R-PDCCH may be defined together with RB allocation information, during R-PDSCH resource allocation.

As described above, the eNB may explicitly signal the R-CCE aggregation level for R-PDCCH transmission to each RN. For example, let us assume that the eNB transmits an R-CCE, which is a transmission unit of an R-PDCCH including control information for a specific RN (RN 1), at an aggregation level 2. In other words, it is assumed that the eNB transmits specific control information (e.g. DL grant) for the RN 1 through 2 RB pairs. If the eNB does not inform the RN 1 of the R-CCE aggregation level, the RN 1 performs blind decoding only for the first of the 2 RB pairs. In this way, the RN 1 performs blind decoding only for an R-PDCCH transmitted through the first slot of the first RB pair to receive an R-PDSCH transmitted through the second slot of the first RB pair.

As the RN 1 is not aware of the R-CCE aggregation level information even though the eNB actually transmits control information through the first slot of the second RB pair, the RN 1 determines that the R-PDSCH is transmitted even in the first slot of the second RB pair, thereby causing decoding failure. Accordingly, it is necessary for the eNB to explicitly inform the RN 1 of the R-CCE aggregation level information so that the RN 1 can accurately receive control information. The RN 1 decodes the R-PDCCH region in units of R-CCE aggregation levels based on the R-CCE aggregation level information. The RN 1 can receive signals from the eNB through the R-PDSCH region corresponding to the R-PDCCH region which has successfully performed decoding.

The RN can discern the R-CCE aggregation level through such explicit signaling and can also implicitly discern the R-CCE aggregation level for R-PDCCH transmission.

2. Implicit Signaling Method

As an example, the eNB may enable the RN to discern an R-CCE aggregation level by using different scrambling sequences with respect to R-CCE aggregation levels of an R-PDCCH for a specific RN. In this case, if the eNB transmits the R-PDCCH using different scrambling sequences with respect to R-CCE aggregation levels, the RN can be implicitly aware of the R-CCE aggregation level by discerning a scrambling sequence applied to the transmitted R-PDCCH. Thus, the eNB uses different scrambling sequences to inform the RN of the R-CCE aggregation level during R-PDCCH transmission. A method for differently applying scrambling sequences to R-CCE aggregation levels may apply different scrambling sequences by varying an initial value of a currently defined scrambling sequence or may vary the definition of the scrambling sequences.

As another example, the eNB may enable the RN to be aware of the R-CCE aggregation level applied to the R-PDCCH by differently applying Cyclic Redundancy Check (CRC) masking of the R-PDCCH. The RN may require an RN Radio Network Temporary Identifier (RNTI) for blind search in the R-PDCCH. The eNB may transmit the RN RNTI by masking it to CRC and, in this case, the eNB may differently CRC mask the RN RNTI according to the R-CCE aggregation level. Through CRC masking, a UE can determine whether the UE can decode a corresponding codeword and CRC masking is defined based on an RNTI value.

As another example, the eNB may enable the RN to be aware of the R-CCE aggregation level applied to the R-PDCCH by differently applying permutation upon mapping of a CCE to REs in the R-PDCCH. Bits of the R-PDCCH are aggregated such that 4 bits are grouped into a pair (quadruplet) and passes through a subblock interleaver. Next, if the permutation or subblock interleaver is differently applied according to the R-CCE aggregation level, the RN may implicitly discern the R-CCE aggregation level applied to the R-PDCCH.

As another example, the eNB may enable the RN to be aware of the R-CCE aggregation level applied to the R-PDCCH by changing a mapping order of symbols or REs within an REG of the R-PDCCH. When the bits of the R-PDCCH are actually mapped to the REG as a quadruplet, the eNB may change the mapping order according to the R-CCE aggregation level. For example, let us assume that one REG includes 4 REs over 4 subcarriers with respect to one symbol index. The eNB may enable the RN to be aware of the R-CCE aggregation level applied to the R-PDCCH by changing an order of mapping R-PDCCH bits with respect to REs or symbols within an REG according to the R-CCE aggregation level and then transmitting the R-PDCCH. In this way, the RN can easily discern the R-CCE aggregation level through a simple method of changing a mapping order of REs or modulated symbols within an REG.

As another example, the eNB may enable the RN to be aware of the R-CCE aggregation level applied to the R-PDCCH by changing a mapping order to an REG unit within an R-CCE of the R-PDCCH. During mapping to REGs within an R-CCE in units of R-CCE aggregation levels (9 REGs per CCE are defined in an LTE system), the eNB may change a mapping order to the REGs with respect to each R-CCE aggregation level to transmit the R-PDCCH so that the RN can be implicitly aware of the R-CCE aggregation level applied to the R-PDCCH.

As another example, the eNB may enable the RN to be aware of the R-CCE aggregation level applied to the R-PDCCH by changing a mapping order between R-CCEs of the R-PDCCH. In the LTE system, symbols are mapped to one CCE and to another CCE. However, since a different number of R-CCEs is used according to the R-CCE aggregation level, a mapping order configuration may be changed such that symbols are sequentially mapped only to partial resources within a corresponding R-CCE according to R-CCE indexes with respect to a used number of R-CCEs (in this case, although a mapping unit is determined based on an REG, it may be determined based on a subcarrier) and are sequentially mapped even to the other REG indexes within the R-CCE. Namely, symbols may first be mapped to the first REG of each R-CCE and then may be mapped to the second REG.

Thus, the eNB may enable the RN to be aware of the R-CCE aggregation level applied to the R-PDCCH using an explicit or implicit method with respect to an R-CCE aggregation level. The RN performs blind search (or decoding) in unit of R-CCE aggregation levels by explicitly receiving signaling for the R-CCE aggregation level from the eNB or implicitly recognizing the R-CCE aggregation level. The RN may receive control information by performing the blind search (or decoding) in units of R-CCE aggregation levels and may receive data from the eNB based on the control information.

<Resource Mapping Method 2 when Resources are Dynamically Allocated>

Another resource mapping method for R-PDCCH transmission and a blind search method in an RN according to the resource mapping method are described. As a second method for mapping an R-CCE to REs to transmit an R-PDCCH for an arbitrary RN, a method for fixing the number of RBs of a frequency domain and varying the number of OFDM symbols of a time domain is considered.

Like the above description of the resource mapping method 1 when resources are dynamically allocated, if a logical basic unit of R-PDCCH transmission for an arbitrary RN is defined as an R-CCE, a modulation scheme for R-CCE transmission is determined according to link quality between an eNB and an RN. If the modulation scheme is determined, the number of necessary REs for unit R-CCE transmission and the number of RB pairs in which R-PDCCH transmission is performed are determined.

An R-CCE aggregation level is determined by the number of one or more OFDM symbols used for R-CCE transmission within an RB pair in which R-CCE, a basic logical unit of R-PDCCH transmission, is transmitted. Namely, if the R-CCE aggregation level is 1, one OFDM symbol is used for R-CCE transmission, and if the R-CCE aggregation level is 2, 2 OFDM symbols are used. If the R-CCE aggregation level is 3, 3 OFDM symbols are used for R-CCE transmission.

A plurality of search spaces per R-CCE aggregation level may be configured. If the number of VRBs necessary for transmitting one R-CCE is determined, a search space is configured according to the R-CCE aggregation level. Each search space may have the same RB position. An RN may perform blind search of each search space based on the number of OFDM symbols at the same RB granularity according to the R-CCE aggregation level.

Namely, in the case of a search space 1, the RN may perform blind search based on one OFDM symbol, and in the case of a search space 2, the RN may perform blind search based on two OFDM symbols.

<Resource Mapping Method 3 when Resources are Dynamically Allocated>

Another resource mapping method for R-PDCCH transmission and a blind search method in an RN according to the resource mapping method are described. As a third method for mapping an R-CCE to REs to transmit an R-PDCCH for an arbitrary RN, a method for fixing the number of RB pairs of a frequency domain and the number of OFDM symbols of a time domain and varying a modulation scheme may be considered.

A modulation scheme used for R-PDCCH transmission may vary according to a search space. Namely, an eNB may transmit an R-PDCCH based on a QPSK scheme in the case of a search space 1 for an arbitrary RN 1 and may transmit the R-PDCCH based on a 16 QAM scheme in the case of a search space 2.

The above-described three resource mapping methods when resources are dynamically allocated to transmit the R-PDCCH may be applied in a hybrid form.

<Resource Mapping Method 4 when Resources are Dynamically Allocated>

The R-PDCCH may use a DCI format which is different from that used by a legacy UE or an LTE-A UE. An example of an R-PDCCH format transmitted by an eNB to an RN may be indicated as shown in the following Table 5.

TABLE 5

| R-PDCCH format | Description |
| --- | --- |
| R-PDCCH format 0 | UL grant for R-PUSCH transmission |
| R-PDCCH format 1 and 2 series | DL grant for R-PUSCH transmission |
| R-PDCCH format 3 series | Transmit Power Control Command (TPC) |

The case where the eNB transmits the R-PDCCH for an RN 1 is described. Upon transmitting a plurality of R-PDCCHs for an RN 1, the eNB may transmit the R-PDCCHs by multiplexing them through a TDM scheme by using consecutive OFDM symbols in the same RB or RB pair according to a predefined rule. For example, if the first R-PDCCH is transmitted within a given RB pair through 4 OFDM symbols from OFDM symbol indexes 3 to 6 of the first slot, the second R-PDCCH may be transmitted through the second slot of the corresponding RB pair. Here, the plurality of R-PDCCHs may be R-PDCCHs having different formats. For example, formats of a plurality of R-PDCCHs may include R-PDCCH formats 1 and 2 for transmitting DL grant, which is control information necessary for the eNB to transmit data to the RN, and an R-PDCCH format 0 for transmitting UL grant, which is necessary for the RN to transmit data to the eNB. For transmission, the DL grant may be allocated to the first slot in a specific RB pair and the UL grant may be allocated to the second slot which consecutively follows the first slot. Especially, according to a predefined rule, the DL grant may be transmitted through 4 consecutive OFDM symbols of OFDM symbol indexes 3 to 6 in the first slot and the UL grant may be transmitted through 7 consecutive OFDM symbols of OFDM symbol indexes 7 to 13 in the second slot.

When the eNB transmits a plurality of R-PDCCHs to a specific RN, the corresponding RN can be aware of an RB position, in which another R-PDCCH directing the RN is transmitted, through blind search with respect to one R-PDCCH. Namely, the R-PDCCH directing the corresponding RN is multiplexed using a TDM scheme through contiguous OFDM symbols in the same frequency position and then transmitted.

Upon detecting one R-PDCCH, the RN performs blind decoding of subsequent OFDM symbols once more. If the RN successfully receives an additional PDCCH of another format through blind decoding of the subsequent OFDM symbols, the RN may perform blind decoding of the next subsequent OFDM symbols once more. The RN performs blind decoding until the RN fails to decode an additional R-PDCCH in corresponding RB pairs.

For example, let us assume that an RN 1 performs R-PDCCH blind search of OFDM symbols of indexes 3 to 6, an R-CCE size of 2 RB pairs for one search space (RB or RB pair indexes 0 to 31) is used, both DL grant and UL grant are transmitted, and the RN 1 succeeds in detecting the DL grant in an RB pair of an index is 24 through blind search of OFDM symbols only of indexes 3 to 6 in RB pairs of indexes 0 to 31. Then since the RN 1 has successfully detected the DL grant in the RB pair of an index 24, the RN 1 further performs blind decoding of OFDM symbols of indexes 7 to 13, which is another RB, in the RB pair of the index 24, thereby confirming whether an additional R-PDCCH is present. In this case, after succeeding in detecting UL grant in OFDM symbols of indexes 7 to 13 in the RB pair of the index 24, the RN 1 performs blind decoding in the next RB pair (i.e. an RB pair of an index 25) and may confirm that there is no additional R-PDCCH.

It has been described that a plurality of R-PDCCHs are allocated using a TDM scheme in consecutive RBs. Similarly, a method for fixing the position of R-PDCCHs by allocating a plurality of R-PDCCHs in the form of FDM through consecutive RBs may be considered.

The above-described embodiments are combinations of elements and features of the present invention in a predetermined type. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims which are not explicitly dependent on each other can be combined to provide an embodiment or new claims can be added through amendment after this application is filed.

Those skilled in the art will appreciate that the present invention may be embodied in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

The RN for receiving signals from the eNB and the signal reception method of the RN is applicable to wireless communication systems such as 3GPP LTE, LTE-A, and IEEE 802 systems.

What is claimed is:

1. A method of transmitting a relay-physical downlink control channel (R-PDCCH) by a base station in a wireless communication system, the method comprising:
transmitting first information indicating a pattern of subframes configured for the base station to a relay node (RN) transmission and second information indicating a set of resources blocks;
transmitting third information used for determining a position of a starting symbol of a physical downlink shared channel (PDSCH) for the RN;
mapping the R-PDCCH to a RN-specific search space of a subframe; and
transmitting the R-PDCCH mapped on the subframe according to the pattern of subframes,
wherein the RN-specific search space of the subframe is located in the set of resource blocks indicated by the second information, and
wherein a position of a starting symbol of the R-PDCCH within a first slot of the subframe is fixed in a time domain.

2. The method of claim 1, wherein the position of the starting symbol of the PDSCH for the RN varies in a time domain according to the third information.

3. The method of claim 1, wherein symbol indexes of the R-PDCCH within the first slot of the subframe are fixed as '3' to '6'.

4. The method of claim 1, wherein the subframe contains a PDCCH for at least one user equipment (UE) and the PDSCH for the RN, and
the PDCCH for the UE is mapped on a control region of the subframe, and both of the R-PDCCH and the PDSCH for the RN are mapped on a data region of the subframe.

5. A base station comprising:
a transmitter configured to transmit first information indicating a pattern of subframes configured for the base station to a relay node (RN) transmission, second information indicating a set of resources blocks and third information used for determining a position of a starting symbol of a physical downlink shared channel (PDSCH) for the RN, and to transmit, through a subframe, a relay-physical downlink control channel (R-PDCCH) according to the pattern of subframes, and
a processor configured to map the R-PDCCH to a RN-specific search space of the subframe,
wherein the RN-specific search space of the subframe is located in the set of resource blocks indicated by the second information, and
wherein a position of a starting symbol of the R-PDCCH within a first slot of the subframe is fixed in a time domain.

6. The base station of claim 5, wherein the position of the starting symbol of the PDSCH for the RN varies in a time domain according to the third information.

7. The base station of claim 5, wherein symbol indexes of the R-PDCCH within the first slot of the subframe are fixed as '3' to '6'.

8. The base station of claim 5, wherein the subframe contains a PDCCH for at least one user equipment (UE) and the PDSCH for the RN, and
the PDCCH for the UE is mapped on a control region of the subframe, and both of the R-PDCCH and the PDSCH for the RN are mapped on a data region of the subframe.

9. A method of receiving a relay-physical downlink control channel (R-PDCCH) by a relay node (RN) in a wireless communication system, the method comprising:
receiving first information indicating a pattern of subframes configured for a base station to the RN transmission and second information indicating a set of resources blocks;
receiving third information used for determining a position of a starting symbol of a physical downlink shared channel (PDSCH) for the RN;
receiving, through a subframe, the R-PDCCH according to the pattern of subframes; and
searching a RN-specific search space of the received subframe to detect the R-PDCCH based on a control channel element (CCE) aggregation level,
wherein the RN-specific search space of the received subframe is located in the set of resource blocks indicated by the second information, and
wherein a position of a starting symbol of the R-PDCCH within a first slot of the subframe is fixed in a time domain.

10. The method of claim 9, wherein symbol indexes of the R-PDCCH within the first slot of the subframe are fixed as '3' to '6'.

11. A relay node (RN) comprising:
- a receiver configured to receive first information indicating a pattern of subframes configured for a base station to the RN transmission, second information indicating a set of resources blocks to receive third information used for determining a position of a starting symbol of a physical downlink shared channel (PDSCH) for the RN and to receive, through a subframe, a relay-physical downlink control channel (R-PDCCH) according to the pattern of subframes; and
- a processor configured to control the receiver and to search a RN-specific search space of the received subframe to detect the R-PDCCH based on a control channel element (CCE) aggregation level,
- wherein the RN-specific search space of the received subframe is located in the set of resource blocks indicated by the second information, and
- wherein a position of a starting symbol of the R-PDCCH within a first slot of the subframe is fixed in a time domain.

* * * * *